United States Patent [19]
Roberts

[11] Patent Number: 5,516,077
[45] Date of Patent: May 14, 1996

[54] RELIEF VALVE WITH INTEGRAL DRAIN LINE COUPLING

[76] Inventor: Jeffrey E. Roberts, 17817 Summer La. South, Fraser, Mich. 48026

[21] Appl. No.: 398,108

[22] Filed: Mar. 3, 1995

[51] Int. Cl.⁶ .................................................. F16K 17/36
[52] U.S. Cl. ............................................ 251/148; 285/354
[58] Field of Search ........................ 251/148; 137/542; 285/39, 175, 354, 355, 286

[56] References Cited

U.S. PATENT DOCUMENTS

| | | | |
|---|---|---|---|
| 4,059,290 | 11/1977 | Ichimi | 285/354 X |
| 4,078,722 | 3/1978 | Luckenbill . | |
| 4,119,295 | 10/1978 | Blocker | 285/354 X |
| 4,134,606 | 1/1979 | Menti, Jr. | 285/286 X |
| 4,898,201 | 2/1990 | Conley et al. | 285/354 X |

*Primary Examiner*—Kevin Lee
*Attorney, Agent, or Firm*—Harness, Dickey & Pierce

[57] ABSTRACT

An improved relief valve is disclosed for use with a pressurized system. The improved relief valve includes an integral drain line coupling that prevents the outlet of the relief valve from being plugged or restricted in any manner such that discharge from the pressurized system flows uninhibited to an appropriate drainage point. The coupling includes a nipple which is rigidly secured to the outlet of the relief valve and which is coupled by a nut member to a drain line. In addition, the nipple is adapted for receiving a wrench for countervailing a torque transferred to the nut member.

11 Claims, 2 Drawing Sheets

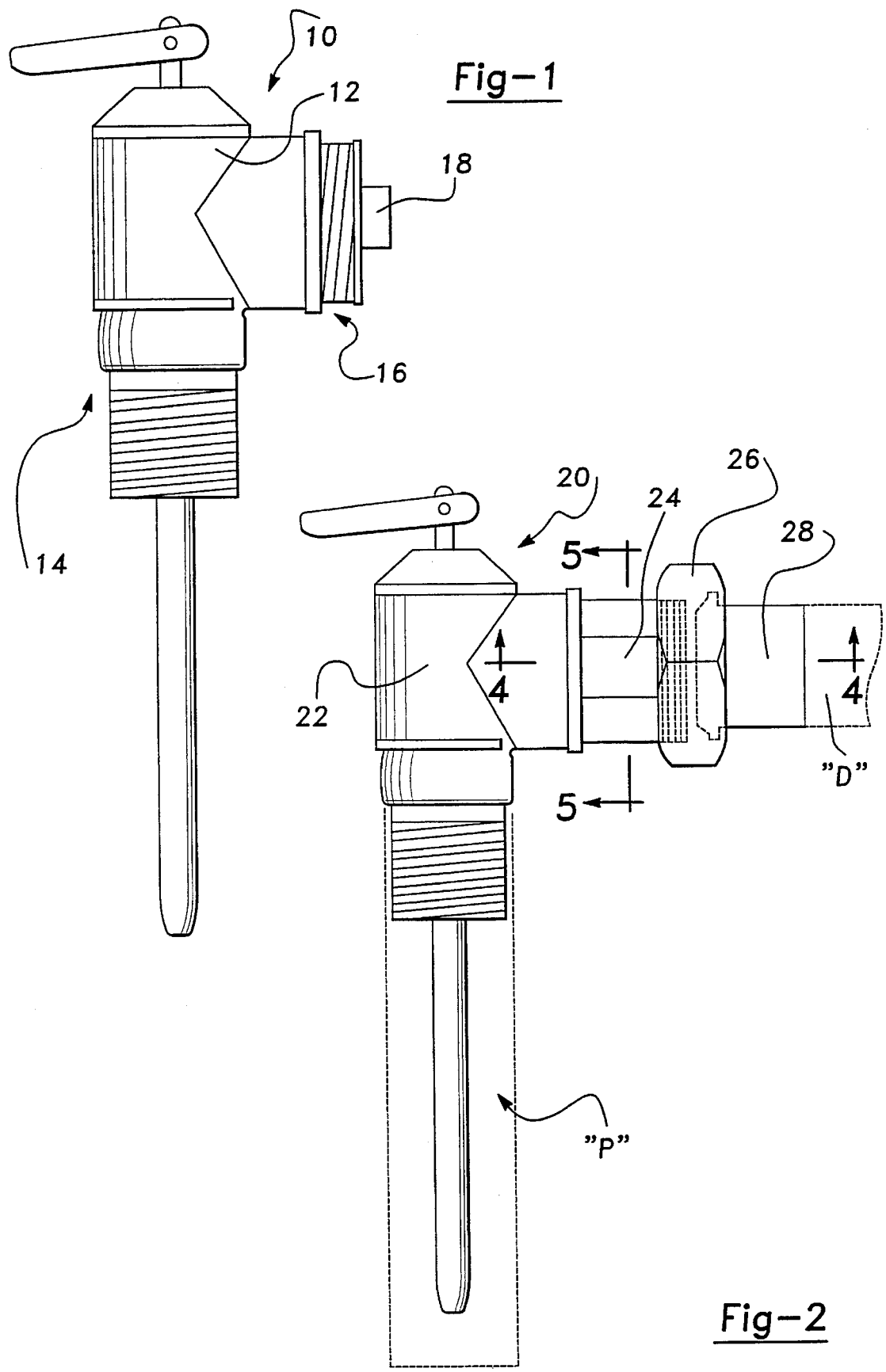

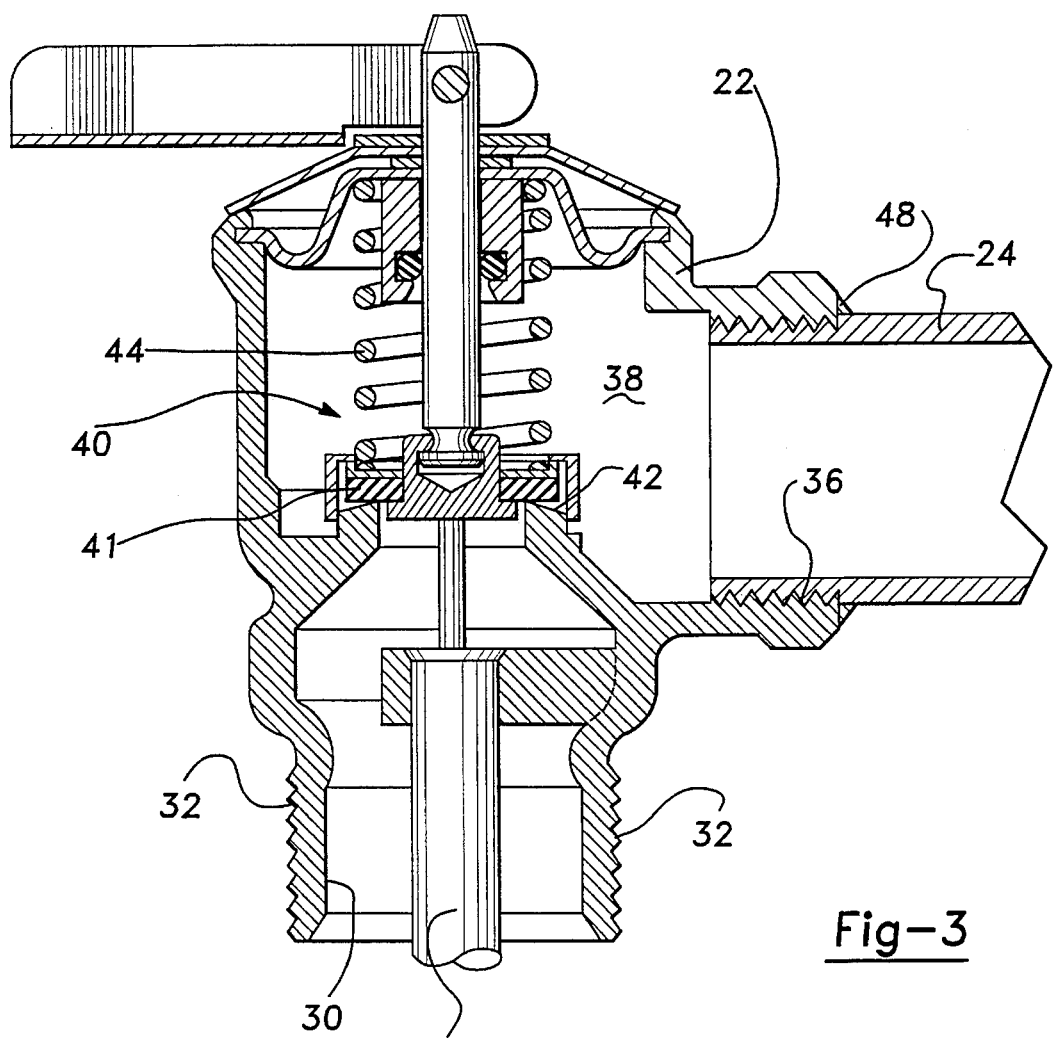
Fig-3
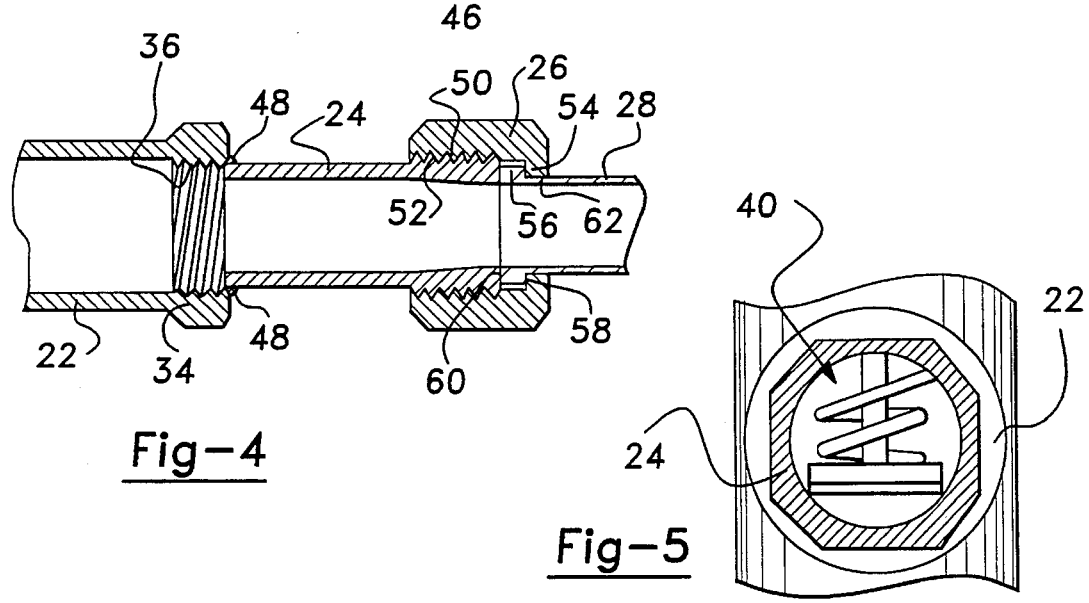
Fig-4
Fig-5

RELIEF VALVE WITH INTEGRAL DRAIN LINE COUPLING

BACKGROUND OF THE INVENTION

The present invention relates generally to relief valves of the type controlling discharge from a pressurized vessel to a drain line and, more particularly, to a relief valve having a coupling for interconnecting the relief valve to the drain line.

As is known, conventional fluid systems are equipped with relief valves for controlling discharge from a pressurized vessel to a drain line in response to a predetermined pressure and/or thermal condition. Such relief valves typically include a valve body that has an inlet interconnectable to the pressurized vessel, an outlet adapted for connection to the drain line, and a valve mechanism for controlling flow from the inlet to the outlet in response to the occurrence of one of the predetermined conditions. Typically, the inlet and outlet portions of the valve body are threaded for threaded engagement with mating couplings associated with the pressurized vessel and the drain line. A disadvantage to this type of valve body is that the threaded outlet may be plugged by a threaded plug member. In such a situation, the plugged outlet prevents the relief valve from performing its primary function of allowing discharge to escape from the pressurized vessel in response to the occurrence of one of the predetermined pressure and/or thermal conditions. As such, the resulting build up of pressure within the pressurized vessel and/or within the relief valve may exceed design specifications and cause a failure in the system.

While conventional relief valves perform satisfactorily when unrestricted, the need exists to develop a relief valve having a drain line coupling that inhibits the valve's outlet from being plugged or restricted.

SUMMARY OF THE INVENTION

Thus, the present invention is directed to overcoming disadvantages commonly associated with relief valves by providing a standard configuration relief valve with a drain line coupling that inhibits access to the valve's outlet. The relief valve commonly provides relief for a pressurized vessel in response to a predetermined pressure and/or thermal condition.

In accordance with the preferred embodiment of the present invention, a relief valve is disclosed for controlling discharge from a pressurized vessel and directing the discharge to a discharge point. The valve includes a standard valve body having a threaded inlet, a threaded outlet, and an internal passage interconnecting the inlet and the outlet. A valve mechanism is disposed within the internal passage and is normally biased to a closed position for preventing discharge from flowing from the inlet to the outlet. The valve mechanism is operable for moving to an open position in response to predetermined operating conditions for allowing discharge from the pressurized vessel to flow from the inlet to the outlet. A coupling assembly is attached to the outlet such that the discharge from the pressurized vessel flows to the discharge point. The coupling assembly is configured such that access to the threads of the outlet is inhibited for permitting unrestricted flow of the discharge.

Additional objects, advantages, and features of the present invention will become apparent from the following description and appended claims, taken in conjunction with the accompanying drawings.

BRIEF DESCRIPTION OF THE DRAWINGS

FIG. 1 is a side view of a prior art relief valve that includes a threaded outlet that is restricted by a threaded plug;

FIG. 2 is a side view of the relief valve in accordance with the present invention;

FIG. 3 is a horizonal cross-sectional view of the valve body of the relief valve in accordance with the present invention;

FIG. 4 is a cross-sectional view taken along line 4—4 of FIG. 2 in accordance with the present invention; and FIG. 5 is a cross-sectional view taken along line 5—5 of FIG. 2 in accordance with the present invention.

DETAILED DESCRIPTION OF THE PREFERRED EMBODIMENT

The present invention is particularly concerned with an improved relief valve for use within a pressurized fluid system of the type normally including a pressurized vessel and a drain line that terminates at a drain point, such as, for example, a sewer system inlet. The invention provides an improved relief valve and coupling for interconnecting the outlet of the relief valve to the drain line such that the discharge flow from the pressurized vessel is not restricted. While the following drawings illustrate a particular construction for the relief valve, it is contemplated that the unique and non-obvious principles and features of the present invention can be incorporated into virtually any valve normally adapted to control the discharge of fluid from a pressurized system in response to the occurrence of a specific pressure and/or thermal condition being detected. For purposes of clarity, the term "fluid" is intended to identify any media (i.e. liquid or gas) that is used in pressurized systems. Likewise, the term "vessel" is intended to identify any component of a fluid pressure system to which a relief valve can be suitably attached in an otherwise conventional manner.

A typical prior art relief valve 10 is shown in FIG. 1 and is of the type that is used in a pressurized system for responding to predetermined thermal and/or temperature conditions. Relief valve 10 includes a hollow valve body 12 which in turn includes interconnected inlet 14 and outlet 16. A typical valve mechanism (not shown) is disposed within valve body 12 which is adapted to move from a closed position to an open position in response to predetermined thermal and/or temperature conditions for allowing discharge entering inlet 14 to flow through outlet 16, thereby reducing the net pressure in the system. However, as will be apparent to one skilled in the art, an externally threaded plug member 18 can be threaded into the internally-threaded outlet 16 for restricting the flow of discharge through relief valve 10. This arrangement is undesirable since such a flow restriction can create an excessive pressure build-up within the system that can cause a failure.

Referring to FIG. 2, improved relief valve 20 of the present invention is shown. Relief valve 20 includes a valve body 22 and a nipple member 24 that is secured thereto. A coupling assembly including a nut member 26 and a discharge pipe 28 are provided for coupling nipple 24 to a drain line. Discharge pipe 28 may either be coupled to the drain line or an integral end portion thereof. As will be described in greater detail below, relief valve 20 is adapted for use with a pressurized fluid system that includes a pressurized vessel, diagrammatically identified at "P", and a drain line, diagrammatically shown at "D". By way of example, relief valve 20 is adapted for use with a hot water tank, boiler, pressurized air tank, or the like.

Turning to FIG. 3, relief valve 20 is shown in a partial cross-sectional view with only a portion of nipple 24 shown attached thereto. In general, valve body 22 is of a standard type similar to that disclosed in U.S. Pat. No. 4,078,722 to Luckenbill which is herein incorporated by reference. Valve body 22 is typically formed of cast brass or the like. Valve body 22 includes an inlet 30 surrounded by external threads 32 by which valve body 22 can be attached to a fluid system including a pressurized vessel. Extending from one side of valve body 22 is an outlet 34 which includes internal threads 36. The interior of valve body 22 is hollow and includes a passage 38 interconnecting inlet 30 and outlet 34. Disposed within passage 38 is a valve assembly 40 having a valve disk 41 which is normally biased to a closed position against a valve seat 42 by a spring 44 such that fluid entering inlet 30 can not flow through passage 38 to outlet 34. The remaining specifics of the configuration of valve assembly 40 are described in U.S. Pat. No. 4,078,722 to Luckenbill and are not described in detail herein.

Located within inlet 30 is temperature probe 46 that is thermally responsive to a predetermined thermal condition. Upon sensing of a thermal condition in excess of the predetermined amount, temperature probe 46 will actuate valve assembly 40 for moving valve disk 41 to an open position. In addition to temperature responsive actuation, valve assembly 40 is also adapted to move valve disk 41 to its open position in response to a predetermined pressure condition existing within inlet 30 and which overcomes the biasing of spring 44. As will be apparent to one skilled in the art, when valve assembly 40 is in the open position in response to either a thermal condition or a pressure condition, discharge from the pressurized system will flow through inlet 30 to outlet 34.

With reference to FIGS. 3 and 4, nipple 24 is shown to have external threads 47 formed on one end that are threadably engaged with internal threads 36 of valve body 22. In addition, nipple 24 is shown welded to outlet 34 of valve body 22 by a bead of welding material 48. Alternatively, valve body 22 can be manufactured to integrally include nipple 24. However, since the present invention is directed to providing a coupling assembly that can be used with existing commercially available relief valves, such as valve 10, the use of a separate nipple 24 is currently preferred. Located at the opposite end of nipple 24 are external threads 50 that cooperate with internal threads 52 of nut member 26.

In accordance with the preferred embodiment and as best shown in FIG. 5 which is a view along line 5–5 of FIG. 2, nipple 24 has an outer peripheral surface which is hexagonally shaped for corporation with a torque exerting device such as, but not limited to, a wrench. The hexagonal shape of nipple 24 allows for cooperation with a wrench for countervailing a torque ultimately transferred to nut member 26 when securing it to nipple 24. This allows the torque transferred to valve body 22 to be minimized. It should also be noted that the particular shape of nipple 24 is merely exemplary and that other types of nipples are within the scope of the present invention.

Returning to FIG. 4, nut member 26 includes radially inwardly extending flange 54 which cooperates with and rigidly secures tubular discharge pipe 28 to nipple 24. Tubular discharge pipe 28 includes a radially outwardly extending circumferential lip 56 which includes face surfaces 58 and 60 that respectively engage flange 54 and nipple 24. As is apparent to one skilled in the art, flange 54 defines an aperture 62 that is configured for receiving tubular discharge pipe 28 therein. When nut member 26 is tightened on nipple 24 via threads 50 and 52, flange 56 is sealed therebetween.

When valve assembly 40 of relief valve 20 is actuated to open in response to a thermal and/or pressure condition, discharge flows uninhibited from outlet 34 through nipple member 24 and tubular discharge pipe to an appropriate discharge point such as, but not limited to, a floor drain or a sewage system inlet. In accordance with the preferred embodiment, tubular discharge pipe 28 is formed from copper tubing but may also be formed from polyvinyl chloride (PVC) plastic tubing. As will be appreciated by one skilled in the art, improved relief valve 20 prevents the installation of a plug on outlet 34, thereby preventing the resulting flow restriction.

The foregoing discussion discloses and describes an exemplary embodiment of the present invention. One skilled in the art will readily recognize from such discussion, and from the accompanying drawings and claims, that various changes, modifications and variations can be made therein without departing from the spirit and scope of the invention as defined by the following claims.

What is claimed is:

1. A relief valve of the type operably coupled to a pressurized vessel for controlling discharge therefrom, said relief valve comprising:

a valve body having an inlet, an outlet, and an internal passage interconnecting said inlet and said outlet, said outlet having internal threads;

relief valve means, disposed within said internal passage and normally biased to a closed position, for movement to an open position in response to predetermined operating conditions thereby allowing the discharge to flow from said inlet to said outlet;

a tubular nipple having a first externally threaded end fixedly secured to said internal threads of said outlet of said valve body, and a second end having external threads formed therein;

a discharge pipe having a radially outwardly extending flange formed at one end thereof; and a nut member having internal threads adapted for threaded engagement with said external threads on said second end of said nipple and a radially inwardly extending flange that defines an aperture, said discharge pipe adapted for retention in said nut member such that said aperture surrounds said discharge pipe and said discharge pipe flange abuts said flange on said nut member;

wherein said nipple is welded to said outlet of said valve body.

2. The relief valve of claim 1, wherein said discharge pipe has a tubular section with said flange defining a circumferentially extending lip having a first face surface and a second face surface, said tubular section being configured for extending through said aperture of said nut member with said first face surface of said lip engaging said flange on said nut member, whereby said internal threads of said nut member engage said external threads of said nipple for causing said second face surface of said lip to abut an end surface of said nipple such that the discharge flows uninhibited from said outlet through said tubular section to a discharge point.

3. The relief valve of claim 1 wherein said nipple includes surface means for cooperating with a wrench such that said nut member may be threadably tightened on said second end of said nipple without transmitting significant torque to said valve body.

4. The relief valve of claim 3 wherein said surface means of said nipple is a hexagonally shaped outer peripheral surface.

5. The relief valve of claim 2 wherein said discharge pipe is formed from copper tubing.

6. The relief valve of claim 2 wherein said discharge pipe is formed from polyvinyl chloride plastic tubing.

7. A relief valve of the type operably coupled to a pressurized vessel for controlling discharge therefrom, the valve comprising:

a valve body having an inlet, an outlet, and an internal passage interconnecting said inlet and said outlet, said outlet having internal threads;

relief valve means, disposed within said internal passage and biased in a normally closed position, for opening in response to predetermined operating conditions thereby allowing the discharge to flow from said inlet to said outlet;

a nipple having a first externally threaded end secured to said internal threads of said outlet of said valve body, an intermediate portion having a hexagonally shaped surface, and a second end having an end face and external threads;

a nut member having internal threads and a radially inwardly extending flange that defines an aperture, said internal threads being configured for cooperation with said external threads of said second end of said nipple; and a tubular section having an end with a circumferentially extending outer lip having a first surface and a second surface, said tubular section being configured for extending through said aperture of said nut with said first surface of said lip engaging said flange, said threads of said nut adapted to engage said threads of said nipple for causing said second surface of said lip to abut said end face of said nipple;

wherein said nipple is welded to said outlet of said valve body.

8. The relief valve of claim 7 wherein said discharge pipe is formed from copper tubing.

9. The relief valve of claim 7 wherein said discharge pipe is formed from polyvinyl chloride plastic tubing.

10. A pressurized fluid system, comprising:

a pressurized vessel containing a pressurized fluid;

a valve body having an inlet connected to said pressurized vessel, an outlet, and an internal passage interconnecting said inlet and said outlet, said outlet having internal threads;

relief valve means, disposed within said internal passage and normally biased to a closed position, for movement to an open position in response to predetermined operating conditions thereby allowing the discharge to flow from said inlet to said outlet;

a tubular nipple having a first externally threaded end fixedly secured to said internal threads of said outlet of said valve body, and a second end having external threads formed therein;

a discharge pipe having a radially outwardly extending flange formed at one end thereof; and a nut member having internal threads adapted for threaded engagement with said external threads on said second end of said nipple and a radially inwardly extending flange that defines an aperture, said discharge pipe adapted for retention in said nut member such that said aperture surrounds said discharge pipe and said discharge pipe flange abuts said flange on said nut member;

wherein said nipple is welded to said outlet of said valve body.

11. The pressurized system of claim 10, wherein the discharge pipe includes an end with a circumferentially extending outer lip having a first surface and a second surface, the discharge pipe being configured for extending through the aperture of the nut with the first surface of the lip engaging the flange of the nut member, whereby the interior threads of the nut engage the exterior threads of the nipple causing the second surface of the lip to abut the outlet of the valve body such that the discharge flows uninhibited from the outlet through the discharge pipe to a discharge point.

* * * * *